Figure 1:
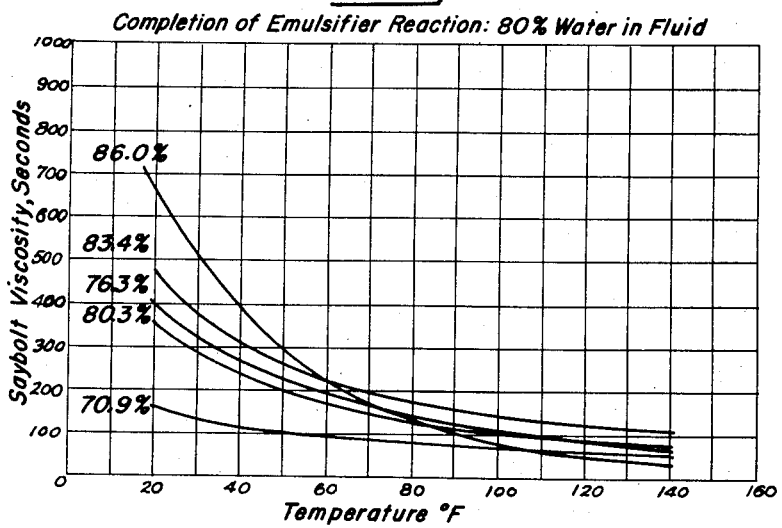

Jan. 10, 1961 G. H. HOMMER 2,967,831
HYDRAULIC FLUID AND ITS PREPARATION
Original Filed Sept. 29, 1954 4 Sheets-Sheet 1

Completion of Emulsifier Reaction: 80% Water in Fluid

Completion of Emulsifier Reaction: 75% Water in Fluid

INVENTOR.
GORDON H. HOMMER
BY
AGENT

INVENTOR.
GORDON H. HOMMER
BY
AGENT

Water Content – 1:1 Oil Emulsifier Ratio

Ethylene Glycol Additions: Group 1

INVENTOR.
GORDON H. HOMMER
BY
AGENT

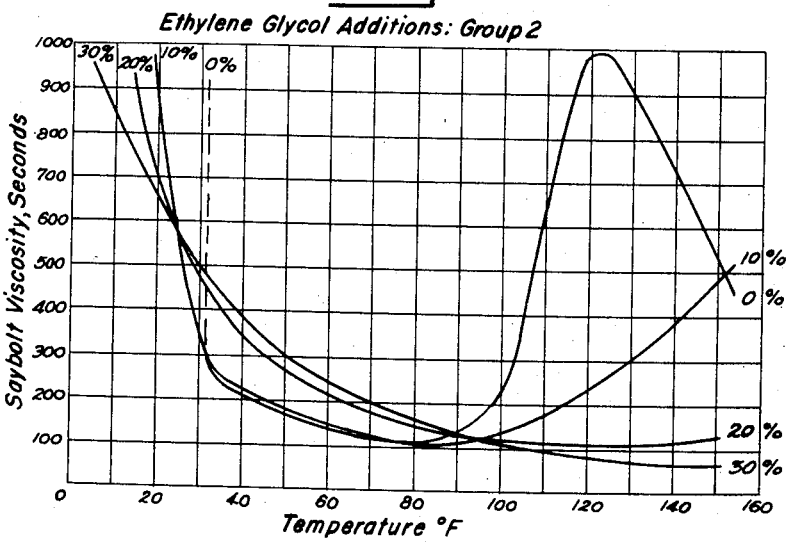
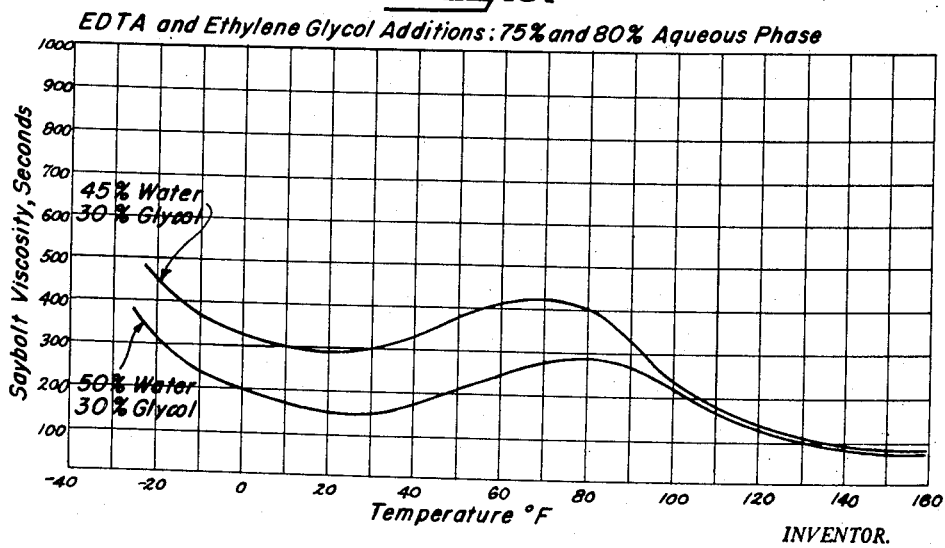

United States Patent Office 2,967,831
Patented Jan. 10, 1961

2,967,831

HYDRAULIC FLUID AND ITS PREPARATION

Gordon H. Hommer, Concord, Calif., assignor to Tidewater Oil Company, a corporation of Delaware Original application Sept. 29, 1954, Ser. No. 459,046, now Patent No. 2,892,854, dated June 30, 1959. Divided and this application Sept. 25, 1958, Ser. No. 768,515

21 Claims. (Cl. 252—77)

This invention relates to hydraulic-fluid compositions for use in devices and systems for the transmission of mechanical energy by fluid pressure, and more particularly, to non-flammable, corrosion-inhibiting hydraulic-fluid compositions which display substantially uniform viscosity characteristics over a rather wide range of temperatures. This application is a division of application Serial Number 459,046, filed September 29, 1954, now U.S. Patent No. 2,892,854.

In any application, it is essential that a hydraulic fluid have certain qualities. It should be non-toxic and non-corrosive to the metal or metals it contacts. It should not be subject to destructive deterioration due to oxidation. It should be compatible with petroleum based fluids and capable of operating in existing equipment without requiring changes in the hydraulic-system. It should be substantially inert to fiber, rubber gaskets and the like; and provide enough lubricity for the moving parts in the system. A recent, more rigorous requirement is non-flammability of the hydraulic-fluid; particularly in certain hydraulic installations, such as ingot manipulators or die cast machines, where high temperatures pose a fire hazard.

In addition to these qualifications, viscosity of the fluid should vary only slightly with temperature. This is particularly true in applications where efficient operation depends primarily on uniform fluid viscosities, as in hydraulic pumps, fluid drive type couplings, and other such devices. Thus, a fluid too light in body at higher temperatures will cause excessive leakage or slip between relatively moving parts and from the high pressure sides of pistons, vanes, and valves. Likewise excessive bodying of the fluid at lower temperatures will cause sluggish machine action and consequent lost production. Moreover, uniform fluid viscosities should extend over as wide a temperature range as possible. Thus, aircraft fluids must permit the system to operate over an exceedingly wide range of temperatures, from at least −10° F. to about 150° F., and should have a freezing point no higher than −50° F., and as low as −65° F. if possible. These latter requirements have eliminated a majority of hydraulic fluids. For example, although ordinary mineral oils are used as hydraulic fluids in some applications, they are unsuited to uses where relatively constant viscosity is required at various temperatures, since mineral oils having viscosities of 100 to 200 S.U.S. @ 100° F. have viscosities of several thousand seconds at 0° F., with correspondingly high viscosities at intermediate temperatures.

The present invention is directed to a hydraulic fluid that will possess all of the above qualifications, and others as will appear. Accordingly, one object of the present invention is to provide fluids especially useful as industrial and aircraft hydraulic fluids which are non-flammable and which manifest a relatively uniform viscosity over a rather wide range of temperatures. Another object of the invention is to provide such fluids which are stable and non-corrosive towards metals. Another object is to provide hydraulic fluids that are substantially inert, non-toxic, and suitable also for use as a lubricant. Other objects and advantages of the present invention will become apparent from the following disclosure.

It is generally known that alkanolamines may be caused to react with fatty acids at temperatures in the range of 300° to 350° F. to form condensation products with the splitting-off of water. Such condensation products have found use as water-soluble, or water-dispersible, wetting agents. These condensation products appear to be composed primarily of amides formed by reaction of the fatty acids at the nitrogen atom of the alkanolamines and esters formed by reaction of the fatty acids with the alcohol group of the alkanolamines.

In accordance with the present invention it has been found that when a fatty acid is reacted with an excess of a primary, secondary or tertiary alkanolamine at a temperature of about 320° F. until between about 75% and about 90% of the acid has been consumed, a reaction product results which has solubility and emulsifying properties not found in the conventional alkanolamine fatty acid condensation products. In addition, when the emulsifier thus formed is mixed with mineral oil in approximately equal proportions, the resulting mixture will dissolve almost any amount of water to a transparent emulsion. It has further been found that the transparent emulsions thus produced display qualities particularly desirable in a hydraulic fluid. Firstly, the fluid emulsions exhibit relatively constant viscosities over a temperature range from about 30° F. to about 180° F. Secondly, being composed primarily of water, the fluid emulsions are non-flammable, non-toxic, and quite stable. Thirdly, due to the character of the water and oil emulsions, the fluids not only provide sufficient lubrication for bearing parts in the system, but also effectively inhibit corrosion of metals contacted within the system.

It is evident that a hydraulic fluid which is essentially an aqueous solution must have a freezing point low enough to avoid any possibility of the separation of solid phases within the system at any temperature to which the fluid may be exposed. As previously indicated, temperatures as low as −50° F. to −65° F. may well be encountered in certain military or aircraft operations. Consequently, in accordance with the general principles of the invention, there may be produced a modified or "second" class of fluid emulsions in which the range of relatively constant viscosity may be extended to include temperatures as low as −20° F. with freezing points being indicated at temperatures as low as −70° F. This class of fluids is particularly suited for use as aircraft fluids, and other comparable applications where relatively low viscosity at very low temperatures is desired. To prepare this latter class of fluids, a water soluble polyhydric alcohol or ether used as a freezing point depressant, such as any of the common glycols or glycol ethers, is added to the aqueous phase of the fluid emulsion up to the eutectic freezing point of the water and glycol mixture. Other freezing point depressants such as glycerol or isopropanol, might also be used but the glycols are preferred due to an unexpected tendency of the latter to prevent bodying of the fluid emulsions in higher temperature ranges as well. For example, ethylene glycol has been found to be particularly useful in preventing a characteristic tendency of the new fluids to increase in viscosity at temperatures above about 80° F. The result is a class of fluid emulsions possessing substantially uniform viscosities over a remarkable range of temperatures, from about −20° F. to about 160° F. with correspondingly lowered freezing points.

Although any fatty acid, either saturated or unsaturated, containing eight or more carbon atoms may be used to prepare the initial emulsifier, the properties of the emulsifier will vary somewhat according to the acid chosen. For example, the unsaturated acids tend to give products of lower melting points than those made from the corresponding saturated acids. Thus, emulsifiers made by condensing mixtures of coconut fatty acids or oleic acid with diethanolamine are liquid at room temperature, whereas corresponding products made with stearic or lauric acids are solid. Likewise, the emulsifying properties vary slightly with the acid chosen, the lower molecular weight saturated acids tending to yield the most intense emulsifiers.

In the preparation of the new hydraulic fluids it is a great advantage for the oil-soluble emulsifier to be a liquid at ambient temperatures, since a liquid material may be more conveniently handled by the various types of blending equipment and a homogeneous blend with the mineral oil is readily obtained without heating. Storage and other handling problems are also facilitated when the emulsifier is a liquid. In the manufacture of our emulsifiers we have found that optimum emulsifying properties in a liquid product can be obtained by the use of a mixture of lauric and oleic acids instead of a single fatty acid. For this purpose we prefer to use a mixture containing a molal ratio of lauric acid to oleic acid of between 3:1 and 1:3 and, particularly, a ratio of about 1.7:1.

When preparing the second class of fluids, i.e., those fluids containing glycol in amounts up to 70% of the aqueous phase, it has also been found desirable to add to the emulsifier-producing reactants between 15% and 25% (based on the total acid equivalent of the mixture) of ethylene diamene tetraacetic acid. Such an addition would, of course, occur prior to the emulsifier producing condensation reaction described above. With emulsifiers so produced, fluid emulsions may be prepared in which the characteristic of substantially uniform viscosity with temperature variation may be further enhanced, particularly at low temperatures, as will appear.

Any of the common alkanolamines, such as for example monoethanolamine, diethanolamine, triethanolamine, dipropanolamine and ethanol butanolamine, may be used in preparing the emulsifiers of the present invention. Mainly for the reason of availability, diethanolamine is preferred. The alkanolamine should be present in a stoichiometric excess and, preferably, in an amount such that the ratio of the NH radicals of the amine to the COOH radicals of the total acid present is between 1.1:1 and 1.5:1, although in some cases it may be advantageous to begin with a stoichiometric equivalent.

To produce the initial emulsifier product, the mixture of fatty acids and alkanolamine is heated to a temperature between about 300° F. and 350° F. in a reaction vessel equipped with means for permitting escape of water formed in the reaction. In most cases, a temperature of 320° F. will be found suitable to cause the reaction to proceed to the desired point in a reasonable time (30 to 90 minutes) while permitting sufficient control to avoid the reaction continuing past the desired point.

As stated prior, the reaction is continued until from 75% to 90% of the acid value present is reacted. This point in the reaction is important. If the reaction is carried beyond about 90% acid consumption, the product functions poorly as an emulsifier for the water and oil emulsions of the invention. If the reaction is stopped before 75% acid consumption, the product is not satisfactorily soluble in the mineral oil. This point in the reaction may be readily determined by removing samples from time to time of the reaction mixture and titrating in an alcoholic medium with standard alkali solution to a phenolphthalein end point. Such titration will be a measure of the amount of the total acid still unconsumed in the reaction. When the desired point is reached, the entire mixture is immediately cooled to below 300° F. and preferably to room temperature.

Examples I to III illustrate the preparation of the initial emulsifier products from the reaction of fatty acids with alkanolamines.

EXAMPLE I 33.7 grams of commercial lauric acid and 28.5 grams of oleic acid were placed in a vented esterification kettle and heated to 200° F. with mixing. 37.8 grams of diethanolamine were then introduced into the kettle and the mixture heated to 320° F., causing the mixture to react with the escape of water from the kettle vent. Samples of the reaction mixture taken at intervals and titrated showed a gradual decrease in acid value. When the titration showed an acid value equivalent to 29.9 mg. of KOH per gram of mixture, indicating an acid consumption of 80.3%, the reaction was stopped by cooling the mixture to room temperature. The approximate time at reaction temperature was observed to be about 57 minutes. The resulting product had the following properties:

| | |
|---|---|
| Color | Dark amber |
| Form | Viscous liquid. |
| Specific gravity | 0.988 at 60° F. |
| Odor | Earthy. |
| Solubility in mineral oil | Complete between 30% and 70% emulsifier. |
| Solubility in water | Produces gel. |

EXAMPLE II

The procedure of Example I was repeated with the exception that all of the reactants were introduced simultaneously into the kettle, and the kettle immediately heated to 320° F. under vacuum. Reaction time at 320° F. was approximately 57 minutes as before. The properties of the resulting product were not substantially different from those set forth in Example I, except that taking water off under vacuum apparently produced a lighter colored product.

EXAMPLE III 274 grams of diethanolamine and 440 grams of commercial fatty acids derived from coconut oil (approx. content: lauric acid 48%, myristic acid 17%, palmitic, stearic and oleic acids 20%, caproic and caprylic acids 15%) were introduced into a vented esterification kettle, all at once, and heated to 320° F. When titration showed an acid value equivalent to 27.3 mg. of KOH per gram of mixture, indicating an acid consumption of 82.7%, the reaction was stopped. The approximate time at reaction temperature was about 55 minutes. The properties of the resulting emulsifier product are as follows:

| | |
|---|---|
| Color | Dark amber. |
| Form | Viscous liquid. |
| Specific gravity | 0.985 @ 60° F. |
| Odor | Earthy. |
| Solubility in mineral oil | Complete. |
| Solubility in water | Produces gel. |

In the manufacture of the above emulsifiers, there is first a neutralization of the amine with the fatty acid to form salts, with an excess of alkanolamine existing over the fatty acid. As the resulting mixture is heated, at least two reactions are believed to take place. In one, an amide is formed between the acid and the amine. In the other, one or both alcohol groups are believed to react with acids to form ester groups. Both of these reactions form water as a by-product. When ethylenediamine tetraacetic acid is also used in preparing the emulsifier the additional reaction is not well understood. It is believed that it acts as a bridging compound between at least some of the fatty acid and some of the alkanolamine or the alkanolamine fatty acid ester. In any event, it enters into the emulsifier-producting reaction and is not separable from the resulting emulsifier product. For brevity, ethylenediamine tetraacetic acid may be referred to hereinafter as EDTA.

In the preparation of emulsifier products using EDTA, the amount of EDTA is important. We prefer to use an amount between about 16% and 18% of the total acid equivalent present in the acid mixture (i.e., fatty acid plus EDTA), although between 15% and 25% may be used. Preferably the EDTA is conveniently mixed with the fatty acid before the addition of the alkanolamine. Illustrative of the preparation of this type emulsifier product is the following example:

EXAMPLE IV 30.3% by weight of lauric acid, 25.6% by weight of oleic acid, 3.5% by weight of EDTA, and 40.6% by weight of diethanolamine were introduced into a vented esterification kettle. The mixture was heated to 320° F. causing the mixture to react with the escape of water from the kettle vent. Samples of the reacting mixture taken at intervals and titrated showed a gradual decrease in acid value. When the titration showed an acid value equivalent to 18.3 mg. KOH per gram of mixture, indicating a consumption of 88.8% of the acid content, the reaction was stopped by cooling the mixture to room temperature. The resulting product had the following properties:

| | |
|---|---|
| Color | Dark amber. |
| Form | Viscous liquid. |
| Density | 8.4 lbs./gallon at 85° F. |
| Odor | Pungent (characteristic). |
| Solubility in mineral oil | Complete between 40% and 80% emulsifier. |
| Solubility in water | Produces gel. |

To make the fluid emulsions of the present invention, an oil-emulsifier base is first prepared by mixing the emulsifier with a suitable mineral oil. By mineral oil is meant that class of refinery distillate fractions often called "heavy distillates," including lubricating oils (also from residues) and other heavy oils for various purposes. The term "lubricating oil" is used, as commonly employed in the petroleum art, to denote refined distillate oils having boiling ranges between about 600° F. and 900° F., and Saybolt Universal viscosities between about 50 seconds and 700 seconds at 100° F. Although any of the heavy distillate oils may be used for the purposes of the invention, it is preferred to use a light lubricating oil boiling between about 600° F. and 750° F. and having a Saybolt Universal viscosity between 80 and 120 seconds at 100° F. A ratio of oil to emulsifier of about 1:1 is preferred when preparing the oil emulsifier base mixture, although a ratio between 2:1 and 1:2 is suitable. The particular ratio of oil to emulsifier will depend to some extent on the mineral oil used and the fluid viscosity ultimately desired; heavier oils requiring more emulsifier and tending to increase viscosity, and, conversely, lighter oils requiring less emulsifier and tending to decrease viscosity.

In practicing the invention, transparent fluid emulsions possessing properties particularly desirable in hydraulic fluids may be prepared by gradually working into the base mixture of oil and emulsifier, quantities of water ranging between about 75% to 85% by weight of the fluid product. Since the viscosity of the resulting fluid mixture is largely dependent on the water content, greater amounts of water are generally not desirable in a hydraulic fluid. On the other hand, when the water content is less than about 73%, the resulting fluids have viscosity characteristics relatively less desirable in hydraulic fluids. No special equipment is required to accomplish the mixing in accordance with the invention.

The following specific examples are for the general purpose of illustrating the preparation of fluid emulsions according to the invention, and also to illustrate their effectiveness as hydraulic fluids. The examples serve a further more specific purpose of illustrating variations in the fluid formulations and the effect of such variations. In each case emulsifiers prepared by the reaction of an excess of an alkanolamine with a fatty acid were mixed with mineral oils to form base emulsions. The mineral oil used in all but Example VII was a light lubricating oil having a Saybolt viscosity of about 100 seconds at 100° F., generally referred to in the petroleum art as "100 Pale Oil." Transparent fluid emulsions, suitable as hydraulic fluids, were then prepared by dissolving the base emulsions in a suitable amount of water, and the viscosities of the resulting fluid emulsions determined over a wide range of temperatures. The effect of varying the degree of completion of the emulsifier producing reaction is illustrated in the following example.

EXAMPLE V

A number of emulsifiers were prepared, according to the general procedure of Example I, with the reaction being stopped in each case after 70% to 90% of the acid present had been reacted. The amount of total acid unconsumed in the reaction was then determined for each reaction product by titrating a sample, in an alcoholic medium, with standard alkali solution to a phenolphthalein end point. The resulting emulsifier products were each mixed 1:1 with 100 Pale Oil and then diluted with water to form transparent fluids. The dilutions were in two series, one containing 80% water by weight and another 75% water. Saybolt viscosities determined for the resulting fluids are set forth in Table A.

*Table A*

SERIES 1: 80% WATER

| Completion of Emulsifier Reaction, Percent | Viscosity of Fluid S.U.S. at— | | | | | |
|---|---|---|---|---|---|---|
| | 34° F. | 50° F. | 77° F. | 100° F. | 120° F. | 140° F. |
| 70.9 | 130 | 107 | 79 | 61 | 53 | 50 |
| 76.3 | 297 | 228 | 146 | 104 | 78 | 65 |
| 80.3 | 269 | 198 | 138 | 104 | 83 | 68 |
| 83.4 | 348 | 262 | 183 | 146 | 122 | 110 |
| 86.0 | 455 | 297 | 142 | 80 | 55 | 40 |

SERIES 2: 75% WATER

| | 34° F. | 50° F. | 77° F. | 100° F. | 120° F. | 140° F. |
|---|---|---|---|---|---|---|
| 77.1 | 653 | 460 | 310 | 182 | 125 | 105 |
| 79.4 | 478 | 319 | 186 | 138 | 98 | 79 |
| 83.4 | 322 | 220 | 143 | 254 | 196 | 173 |
| 88.9 | 204 | 157 | 105 | 240 | 1,010 | 423 |

Figure 2:
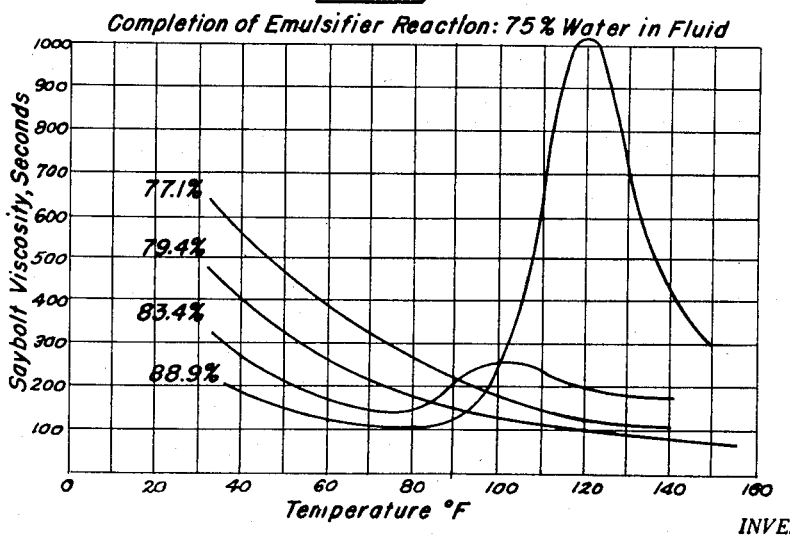

These data are graphically represented in Figs. 1 and 2 and indicate that emulsions best suited as hydraulic fluids result from emulsifiers produced by reactions terminated between about 75% and 85% of completion. Also indicated is the effect of greater amounts of water in retarding a characteristic tendency of the new fluids to increase in viscosity with temperature.

The effect of varying the ratio of oil to emulsifier is illustrated in Example VI.

EXAMPLE VI

Using an emulsifier reaction product prepared as in Example II, and indicating an acid consumption of 83.5%, a number of base emulsions were prepared by agitation with 100 Pale Oil. The ratio of oil to emulsifier was varied between about 1:2 and 2:1 for the various base emulsions, with each being subsequently diluted with water in an amount equal to 75% of the final fluid product. Saybolt viscosities were then determined for the fluids between about 30° and 150° Fahrenheit. Representative viscosity-temperature data are set forth in Table B, and plotted in Fig. 3.

Table B

| Ratio of Oil to Emulsifier | Viscosity of Fluid S.U.S. at— | | | | | |
|---|---|---|---|---|---|---|
| | 34° F. | 50° F. | 77° F. | 100° F. | 120° F. | 140° F. |
| 1.5:1 | 289 | 218 | 127 | 89 | 71 | 63 |
| 1:1 | 322 | 220 | 143 | 254 | 196 | 173 |
| 1:1.5 | 246 | 175 | 117 | 239 | 992 | 711 |

Figure 3:
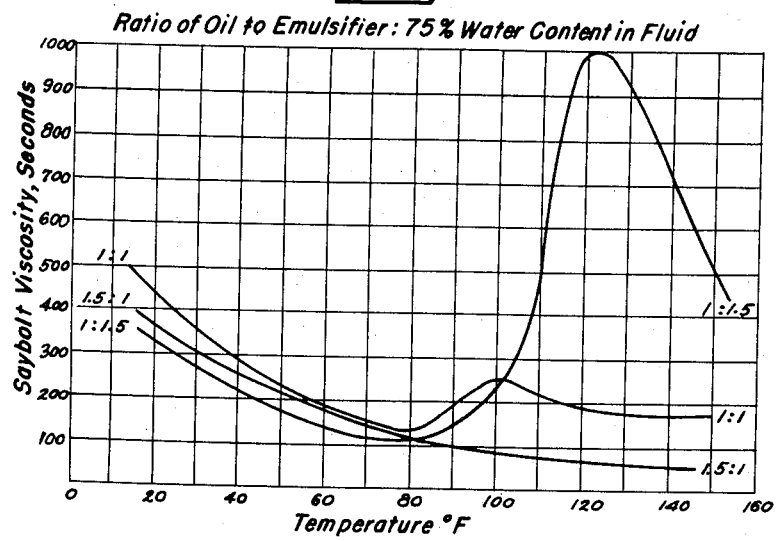

Referring to Figure 3, it is apparent that a greater proportion of oil tends to counteract the characteristic tendency of the emulsifier to increase to a peak viscosity between about 80° F. and 160° F. An optimum ratio, represented by the flattest viscosity-temperature curve, is indicated at a ratio of approximately 1:1.

The applicability of various lubricating oils in the fluids of the present invention is illustrated by the following example:

EXAMPLE VII

A number of fluids were prepared generally as in Examples V and VI. The formulation, in each case, was based on an emulsifier indicating 83.5% acid consumption; a ratio of oil to emulsifier of 1:1; and a water dilution corresponding to 75% water in the final fluid product. However, instead of 100 Pale Oil, other light lubricating oils of greater viscosity were used. Included were solvent treated naphthenic oils having approximate Saybolt viscosities of 300 and 600 seconds at 100° F.; commonly referred to in the petroleum industry as "300 Pale Oil" and "600 Pale Oil," respectively. Also used was a solvent treated paraffin base oil having an approximate Saybolt viscosity of 90 seconds at 100° F., commonly referred to as "90 Neutral Oil." Temperature-viscosity determinations performed on these fluids are set forth in Table C and plotted in Fig. 4.

Table C

| Type Oil | Viscosity Index of Oil | Viscosity of Fluid S.U.S. at— | | | | | |
|---|---|---|---|---|---|---|---|
| | | 34° F. | 50° F. | 77° F. | 100° F. | 120° F. | 140° F. |
| 100 Pale Oil | 40 | 316 | 233 | 138 | 98 | 84 | 140 |
| 300 Pale Oil | 30 | 251 | 180 | 113 | 81 | 69 | 93 |
| 600 Pale Oil | 25 | 276 | 272 | 156 | 106 | 83 | 91 |
| 90 Neutral Oil | 85 | 458 | 309 | 171 | 115 | 87 | 72 |

Figure 4:
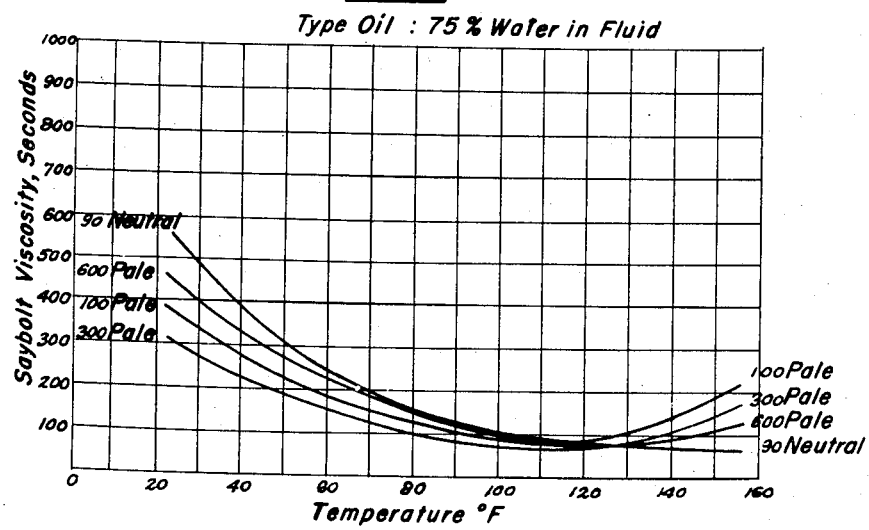

As best seen in Fig. 4, appreciable variations in the grade of lubricating oil produce only slight variations in temperature-viscosity characteristics of the fluid emulsions, although a normal tendency of the heavier oils to increase in viscosity at lower temperatures is indicated.

The water content of the new hydraulic fluids appears to be somewhat critical. Too much water may produce viscosities too low for widespread use, whereas too little water may cause excessive bodying of the fluid. The effect of varying the water content is illustrated in the following example.

EXAMPLE VIII

Figure 5:
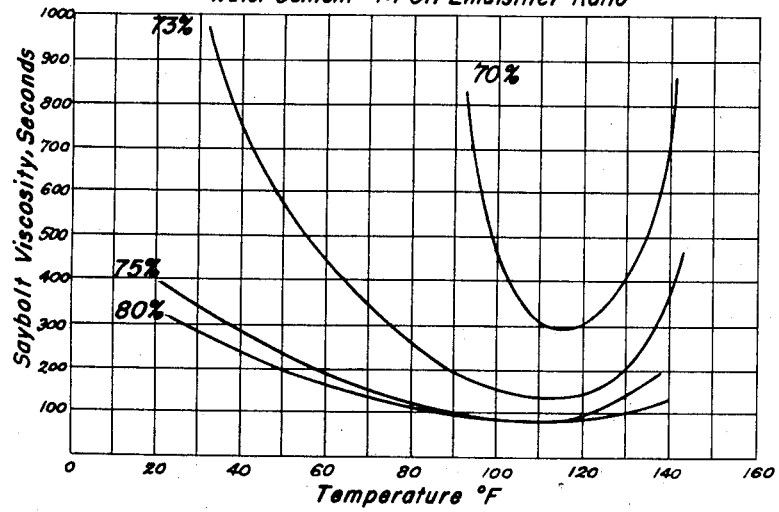

A number of oil-emulsifier base emulsions were prepared by mixing equal amounts of 100 Pale Oil and an emulsifier prepared generally as in Example I indicating 83.5% acid consumption. Varying amounts of water were then mixed with the base emulsions to form fluid emulsions, and the temperature-viscosity characteristics of the fluids determined as before. The results are set forth in Table D, and graphically in Fig. 5.

Table D

| Water Content, Percent | Viscosity of Fluid S.U.S. at— | | | | | |
|---|---|---|---|---|---|---|
| | 34° F. | 50° F. | 77° F. | 100° F. | 120° F. | 140° F. |
| 70.0 | 15,000 | 7,100 | 2,550 | 446 | 314 | 788 |
| 73.0 | 948 | 555 | 284 | 148 | 142 | 385 |
| 75.0 | 316 | 233 | 138 | 98 | 84 | 149 |
| 80.0 | 270 | 201 | 129 | 99 | 83 | 110 |

The following example illustrates the preparation of fluids from emulsifiers condensed from a mixture of coconut fatty acids with a dialkanolamine.

EXAMPLE IX

A number of emulsifier products were made following the procedure of Example III with the reaction being stopped at several different points to produce emulsifiers containing varying amounts of unconsumed acid. From the resulting reaction products, base emulsions were prepared, each containing equal amounts of emulsifier and 100 Pale Oil. These base emulsions were then diluted with water to a final water content of about 75%, based on the final fluid product. Viscosity-temperature data, as well as the compositions of the various fluids, are set forth in Table E.

Table E

| Fluid composition, Weight percent | | | Unconsumed Acid, percent | Viscosity of Fluid S.U.S. at— | | | | | |
|---|---|---|---|---|---|---|---|---|---|
| Emulsifier | Oil | Water | | 34° F. | 50° F. | 77° F. | 100° F. | 120° F. | 140° F. |
| 12.5 | 12.5 | 75.0 | 87.0 | 180 | 89 | 76 | 199 | 261 | 208 |
| 14.0 | 14.0 | 72.0 | 87.3 | 421 | 302 | 200 | 542 | 500 | 327 |
| 14.0 | 14.0 | 72.0 | 88.0 | 409 | 300 | 251 | 434 | 486 | 410 |

Fluid emulsions prepared generally as in Examples V to IX not only are non-flammable because of their high water content, but also possess unusual temperature viscosity characteristics which particularly adapt them for use as hydraulic fluids. Compared to conventional hydraulic fluids, the fluids of the present invention exhibit a unique tendency to maintain substantially uniform viscosities over a rather wide temperature range. In some cases, the fluids actually become more viscous with an increase in temperature, which is in direct contrast to the normal temperature-viscosity relationship found with conventional fluids. For example, fluids based on a more completely reacted emulsifier product, or on a base emulsion containing a substantially greater proportion of emulsifier, indicate a definite tendency to increase in body above about 80° F., as is illustrated in Figs. 2 and 3 and in Table E. As previously mentioned, it has been found that by adding to such fluids an effective amount of a polyhydric alcohol, such as ethylene glycol, this tendency to increase in body may be substantially decreased. The result is a considerable expansion in the use and flexibility of compounding of the fluids of the present invention as is illustrated by the following example.

EXAMPLE X

Oil-emulsifier base emulsions with a known propensity for producing fluids tending to increase in viscosity with an increase in temperature were selected for test. Fluid emulsions were then prepared in two groups: Group 1 based on a 1:1 ratio of 100 Pale Oil with an emulsifier indicating 88.9% acid consumption; and Group 2 based on a 1:1.5 ratio of 100 Pale Oil with an emulsifier indicating 83.5% acid consumption. In each group fluids were prepared containing 25% by weight of oil-emulsifier base and, respectively, 0%, 10%, 20%, and 30% by weight of ethylene glycol. The compositions of the resulting fluids as well as temperature-viscosity data relating to each fluid are set forth in Table F, and plotted graphically in Figs. 6 and 7.

*Table F*

GROUP 1: UNCONSUMED ACID IN EMULSIFIER, 88.9%

| Fluid Composition, Weight Percent | | | | Viscosity of Fluid S.U.S. at— | | | | | | |
|---|---|---|---|---|---|---|---|---|---|---|
| Emulsifier | Oil | Water | Ethylene Glycol | 20° F. | 34° F. | 50° F. | 77° F. | 100° F. | 120° F. | 140° F. |
| 12.5 | 12.5 | 75.0 | 0.0 | ---- | 204 | 157 | 105 | 240 | 1,010 | 423 |
| 12.5 | 12.5 | 65.0 | 10.0 | 745 | 303 | 190 | 131 | 144 | 295 | 439 |
| 12.5 | 12.5 | 55.0 | 20.0 | 600 | 402 | 286 | 160 | 121 | 111 | 119 |
| 12.5 | 12.5 | 45.0 | 30.0 | 550 | 356 | 245 | 136 | 101 | 86 | 76 |

GROUP 2: UNCONSUMED ACID IN EMULSIFIER, 83.5%

| 15.0 | 10.0 | 75.0 | 0.0 | ---- | 246 | 175 | 117 | 239 | 992 | 711 |
| 15.0 | 10.0 | 65.0 | 10.0 | 900 | 265 | 187 | 119 | 140 | 246 | 359 |
| 15.0 | 10.0 | 55.0 | 20.0 | 730 | 409 | 267 | 152 | 118 | 112 | 117 |
| 15.0 | 10.0 | 45.0 | 30.0 | 653 | 454 | 306 | 172 | 109 | 86 | 74 |

Figure 6:
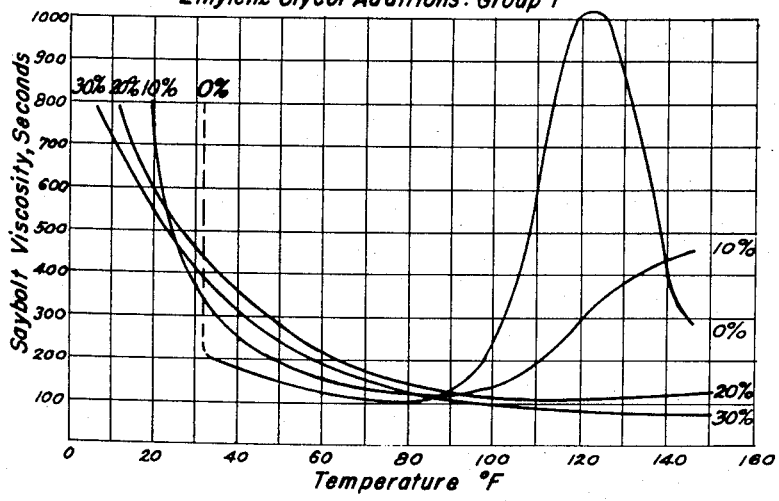

Referring to Figs. 6 and 7, the effect of adding ethylene glycol into the water phase of the two selected fluids may be readily observed. In each case, the tendency to increase in viscosity with increase in temperature was effectively counteracted by a glycol addition of from 10 to 30% by weight of the fluid.

In preparing the second class of fluid emulsions for low temperature operations, any of the common glycols or glycol ethers having from about 2 to 14 carbon atoms may be used. Such materials may include ethylene glycol, diethylene glycol, triethylene, ethylene glycol ethers such as ethyl methyl, propyl and butyl ethers, and similar ethers of diethylene and triethylene glycol. In general, it is preferred to use simpler compounds as represented by the polyhydric alcohols, such as ethylene glycol, since they are easily obtainable and blend easily with water to give very low-freezing mixtures. Of greater significance is the ease with which the resulting glycol and water mixtures blend with the base emulsions to form the transparent fluids of the present invention. Accordingly, the external or "aqueous phase" of the new fluids may consist either of water or blends of glycol and water containing up to 70% of glycol in the aqueous phase.

The exact amount of glycol to be mixed into the aqueous phase of the new fluid emulsions will depend largely on the low temperature specifications to be met. For example, specifications for aircraft hydraulic fluids often specify a freezing point no higher than —50° F., with even lower freezing points being desirable, whereas less rigorous specifications are established for other military or industrial applications. By varying the percent of glycol present in the aqueous phase of the present fluids, it is possible to adapt the fluids to almost any low temperature specification. For example, the freezing point of the eutectic mixture of ethylene glycol and water, i.e., 67% glycol and 33% water, is —65° F. By using such a mixture as the aqueous phase of a fluid emulsion of the present invention, the freezing point of the resulting fluid may be lowered to below —70° F. A less pronounced depressant effect on the freezing point may be achieved by the use of lesser amounts of glycol in the aqueous phase, as is illustrated in the following example.

EXAMPLE XI

Using an emulsifier prepared generally as in Example I and indicating an acid consumption of 83.5%, a base emulsion was prepared by mixing the emulsifier with 100 Pale Oil in the ratio of 1.5:1. Fluid emulsions were then prepared by diluting portions of the base emulsion with mixtures of water and glycol. In each case, the mixtures of glycol and water comprising the aqueous phase amounted to no more than 75% by weight of the emulsion. However, the amount of ethylene glycol in the various fluids was varied from 0% to 50%. The depressant effect of the added glycol on the freezing points of the fluid emulsions, as compared to those of the aqueous phase containing only water and glycol, may be observed from the data set forth in Table G.

*Table G*

| Ethylene Glycol in Fluid, Percent | Ethylene Glycol in Aqueous Phase, Percent | Freezing Point of Aqueous Phase, ° F. | Freezing Point of Fluid, ° F. |
|---|---|---|---|
| 0 | 0 | 32 | 31 |
| 10 | 13.3 | 22 | 10 |
| 20 | 26.6 | 7 | —2 |
| 30 | 40.0 | —16 | —20 |
| 40 | 53.3 | —48 | —54 |
| 50 | 66.7 | —65 | —70 |

It will be understood that the glycol may be added in amounts exceeding the requirements of a eutectic mixture, while still achieving a depressant effect. Generally, however, such additions would not be feasible due to the greater cost of the glycol.

In conducting low temperature studies, it has also been found that fluids based on emulsifiers containing EDTA, as in Example IV, display a further unique tendency toward substantially uniform viscosities at temperatures approaching those of the depressed freezing temperatures of the fluids. This is in contrast to conventional fluids, and to a lesser degree with the new fluids not based on EDTA (Figs. 6 and 7), which show a decided tendency to steadily increase in viscosity as temperatures are decreased toward the freezing point. Due to this added effect of EDTA, it is possible to prepare a class of fluids particularly adapted for low temperature work that requires appreciably less of the polyhydric alcohols, such as ethylene glycol. This phenomenon is illustrated in Example XII and in Fig. 8.

EXAMPLE XII

Using 100 Pale Oil and the emulsifier of Example IV, fluid emulsions were prepared in the proportions set forth in Table H. Temperature-viscosity data for the fluids, also set forth in Table H, are plotted in Fig. 8.

Table H

| Fluid Composition, Weight Percent | | | | Percent Glycol in Water Phase | Freezing Point, °F. | Viscosity of Fluid S.U.S. at— | | | | | | | | | |
|---|---|---|---|---|---|---|---|---|---|---|---|---|---|---|---|
| Emulsifier | Oil | Water | Glycol | | | −20° F. | 0° F. | 20° F. | 32° F. | 50° F. | 77° F. | 100° F. | 120° F. | 140° F. | 160° F. |
| 12.0 | 8.0 | 50.0 | 30.0 | 37.5 | −22 | 312 | 200 | 163 | 160 | 215 | 282 | 219 | 141 | 95 | 66 |
| 15.0 | 10.0 | 45.0 | 30.0 | 40.0 | −26 | 445 | 330 | 295 | 310 | 380 | 420 | 235 | 145 | 95 | 67 |

In addition to substantially uniform viscosity over a rather wide range of temperatures, the fluids of the present invention also display unusual properties of corrosion resistance. This is true despite the large quantity of water present in each of the fluids. This desirable characteristic results primarily from anti-corrosive properties imparted to the aqueous or continuous phase of the emulsion by the dispersed oil-emulsifier base. Although the degree of dispersion of the oil-emulsifier or internal phase is not completely known, sufficient dispersion occurs so that all danger of subsequent agglomeration is removed. This is evidenced by the fact that the fluid emulsions of the present invention are permanent, transparent solutions, that do not separate or segregate, indicating that the fluids probably are colloidal solutions having particle sizes in the dispersed phase between 0.1 and 0.001 micron ("Chemical Engineers' Handbook," Perry, 2nd Ed., p. 1532).

The corrosion resistance of the fluids of the present invention are illustrated by the following example:

EXAMPLE XIII

The rust preventing characteristics of several fluids were determined according to a modification of A.S.T.M. method D665–53. Since the normal composition of the fluids included from 70% to 80% water, no further additions of water were made. Other modifications were to omit paddles or stirring, and to conduct the tests on brass specimens as well as carbon steel. In conducting the test the specimens were immersed in fluid emulsions for a period of 48 hours. The test fluids were prepared as in Example V from an emulsifier indicating 83.0% acid consumption. For comparison, specimens were also immersed in distilled water. Compositions of the various test fluids as well as the results of the determinations are set forth in Table J.

Table J

| Composition of Fluid, Weight Percent | | | Composition of Test Specimen | Condition of Specimen |
|---|---|---|---|---|
| Emulsifier | 100 Pale Oil | Water | | |
| 14.0 | 14.0 | 72.0 | Carbon Steel (ASTM: A108). | Absolutely bright. |
| 12.5 | 12.5 | 75.0 | ----do---- | Do. |
| 0 | 0 | 100.0 | ----do---- | Severe rusting. |
| 13.8 | 13.8 | 72.4 | Brass (ASTM B 16). | Absolutely bright. |
| 12.5 | 12.5 | 75.0 | ----do---- | Do. |
| 0 | 0 | 100.0 | ----do---- | Severe corrosion. |

The results set forth in Table J indicate good corrosion resistance for the new fluids.

Throughout the application, first and second classes of intermediate and end products have been discussed. Those skilled in organic chemistry will readily understand, however, that many variations may be represented by each class. Many details and explanations of features of the invention have also been presented to enable those skilled in the art to practice and use the same, but it is obvious that the invention is not necessarily limited to the details, explanations, and uses given. For example, in the specification and claims reference is at times made to intermediate condensation products as "emulsifiers," and to fluid emulsion end products as "hydraulic fluids." In fact, however, it may be that the intermediate and end products will have properties and uses other than as emulsifiers or hydraulic fluids. In particular, the fluid emulsions disclosed would have general application wherever a non-flammable, non-corrosive fluid of substantially uniform viscosity could be used. Accordingly many differing embodiments and applications of the invention will suggest themselves to workers in the art without departing from the spirit and scope of the invention.

I claim:

1. A water soluble oil-emulsifier base useful in the preparation of aqueous fluid emulsions consisting essentially of a petroleum oil fraction mixed in approximately equal proportions with the product made by the process of reacting at a temperature between about 300° F. and 350° F. a mixture of fatty acid having at least eight carbon atoms per molecule and a lower alkanolamine until between 75% and 90% of the total acid value and no more is consumed in a water-splitting reaction, and removing said water from the resulting product, the alkanolamine being present in amount between 1.1 and 1.5 equivalents per equivalent of acid.

2. A water soluble oil-emulsifier base useful in the preparation of aqueous fluid emulsions consisting essentially of a petroleum oil fraction mixed in approximately equal proportions with the reaction product made by reacting at a tempeature between about 300° F. and 350° F. a lower alkanolamine with an acid stock consisting on an acid-equivalent basis essentially of 100% to 75% fatty acid having at least eight carbon atoms per molecule and 0% to 25% ethylene diamine tetraacetic acid until between 75% and 90% of the total acid value is consumed in a water-splitting reaction, and removing said water from the resulting product, the alkanolamine being present in an amount between 1.1 and 1.5 equivalents per equivalent of acid.

3. A transparent aqueous emulsion product containing 75% to 85% aqueous phase and 25% to 15% of the base of claim 2.

4. A non-flammable, corrosion resistant hydraulic fluid having the property of relatively uniform viscosity over a rather wide range of temperatures comprising from about 75% to 90% by weight of water, from about 5% to about 15% by weight of a heavy distillate oil, and from about 5% to about 15% by weight of a product of an incomplete water-splitting reaction between a fatty acid and a lower alkanolamine wherein between 75% and 90% of the acid value is consumed, which product has the capacity of forming a permanent transparent emulsion between the water and oil; said hydraulic fluid having a maximum variation in viscosity of not more than 1000 Saybolt Universal seconds with variations in the temperature of the fluid from about 30° F. to about 180° F.

5. The fluid of claim 4 in which said heavy distillate oil is a lubricating oil boiling between about 600° F. and 900° F. and having a Saybolt Universal viscosity between about 50 and 700 seconds at 100° F.

6. A non-flammable, corrosion resistant hydraulic fluid having the property of relatively uniform viscosity over a rather wide range of temperatures comprising from about 70% to 90% by weight of a solution of water and a freezing point depressant selected from the group consisting of glycols and glycol ethers having from 2 to 14 carbon atoms, from about 5% to about 15% by weight of a heavy distillate oil, and from about 5% to about 15% by weight of a product of an incomplete water-splitting reaction between a fatty acid and a lower alkanolamine wherein between 75% and 90% of the acid value is consumed, which product has the capacity of forming a permanent transparent emulsion between the water and oil.

7. A non-flammable, corrosion resistant hydraulic fluid having the property of relatively uniform viscosity over a rather wide range of temperatures comprising from about 70% to 90% by weight of a solution of water and a freezing point depressant selected from the group consisting of glycols and glycol ethers having from 2 to 14 carbon atoms, from about 5% to about 15% by weight of a heavy distillate oil, and from about 5% to about 15% by weight of a product of an incomplete water-splitting reaction between ethylenediamine tetraacetic acid, a fatty acid and a lower alkanolamine wherein between 75% and 90% of the total acid value is consumed, which product has the capacity of forming a permanent transparent emulsion between the water and oil.

8. A non-flammable, corrosion resistant hydraulic fluid having the property of relatively uniform viscosity over a rather wide range of temperatures consisting essentially of from about 5% to about 15% of the product of an incomplete condensation reaction at about 320° F. between a fatty acid containing eight or more carbon atoms and a lower alkanolamine wherein between 75% and 90% of the acid value is consumed, from 5% to about 15% of a heavy distillate oil boiling between about 600° F. and 900° F., from about 10% to about 80% by weight water, and from about 10% to about 55% by weight of a freezing point depressant selected from the group consisting of glycols and glycol ethers having from 2 to 14 carbon atoms.

9. A non-flammable, corrosion resistant hydraulic fluid having the property of relatively uniform viscosity over a rather wide range of temperatures consisting essentially of from about 5% to about 15% of the product of an incomplete condensation reaction between a fatty acid containing eight or more carbon atoms, ethylenediamine tetraacetic acid, and a lower alkanolamine wherein between 75% and 90% of the total acid value is consumed, from 5% to about 15% of a heavy distillate oil boiling between about 600° F. and 900° F., from about 10% to about 80% by weight water, and from about 10% to about 55% by weight of a freezing point depressant selected from the group consisting of glycols and glycol ethers having from 2 to 14 carbon atoms.

10. The process for the manufacture of an oil emulsifier base adapted to the preparation of aqueous emulsions having temperature-viscosity characteristics useful in a hydraulic fluid which comprises: reacting a mixture of fatty acid having at least eight carbon atoms per molecule with a lower alkanolamine at a temperature between about 300° F. and 350° F. until between 75% and 90% of the total acid value is consumed in a water splitting reaction, removing said water from the resulting product, and mixing said product with a petroleum oil fraction in a ratio of oil to product between about 1:2 to about 2:1.

11. The process of claim 10 in which said petroleum oil fraction has a Saybolt Universal viscosity at 100° F. between 50 and 700 seconds.

12. A base useful in the preparation of aqueous emulsions consisting essentially of the product made by the process of claim 10.

13. The process for the manufacture of an oil-emulsifier base adapted to the preparation of non-flammable, corrosion resistant, aqueous emulsions having temperature-viscosity characteristics useful in hydraulic fluids which comprises: reacting at a temperature between about 300° F. and about 350° F. a mixture of fatty acid having at least eight carbon atoms per molecule, ethylenediamine tetraacetic acid and a lower dialkanolamine until between 75% and 90% of the total acid value is consumed in a water splitting reaction, the ethylenediamine tetraacetic acid being present in said mixture in an amount between 15% and 25% of the total acid equivalent and the dialkanolamine being present in an amount between 1.1 and 1.5 equivalents per equivalent of total acid, removing from the resulting product the water split off, and mixing the product wtih a petroleum oil fraction in a ratio of oil to product between about 1:2 to about 2:1.

14. The process of claim 13 wherein the ethylenediamine tetraacetic acid is present in the mixture in an amount between 16% and 18% of the total acid equivalent.

15. The process for preparing a corrosion resistant, non-flammable, aqueous emulsion exhibiting temperature-viscosity characteristics useful in a hydraulic fluid which comprises: reacting a mixture of fatty acid having at least eight carbon atoms per molecule with a lower alkanolamine at a temperature between about 300° F. and 350° F. until between 75% and 90% of the total acid value is consumed in a water-splitting reaction, removing said water from the resulting product, mixing said product with a petroleum oil fraction in a ratio of oil to product between about 1:2 to about 2:1 to form an oil-emulsifier base and mixing water into said base to form a transparent aqueous emulsion containing between about 75% and about 85% aqueous phase.

16. An aqueous emulsion product useful as a hydraulic fluid consisting essentially of the product made by the process of claim 15.

17. The process for preparing a corrosion resistant, non-flammable, aqueous emulsion exhibiting temperature-viscosity characteristics particularly useful in a hydraulic fluid adapted for low temperature operations which comprises: reacting a mixture of fatty acid having at least eight carbon atoms per molecule with a lower alkanolamine at a temperature between about 300° F. and 350° F. until between 75% and 90% of the total acid value is consumed in a water-splitting reaction, removing the water split off from the product, mixing the product with a petroleum oil fraction in a ratio of oil to product between about 1:2 to about 2:1 to form an oil-emulsifier base, and mixing into said base a solution of water and a polyhydric alcohol useful as a freezing point depressant, in proportions sufficient to form a transparent aqueous emulsion which has a freezing point lower than that of said solution.

18. The process of claim 17 wherein said polyhydric alcohol is ethylene glycol.

19. The process of claim 17 wherein the reaction mixture also includes ethylenediamine tetraacetic acid in an amount between 15% and 25% of the total acid equivalent, whereby the low temperature viscosity-temperature characteristics of said transparent aqueous emulsion are further enhanced.

20. An aqueous emulsion product useful as a hydraulic fluid consisting essentially of the product made by the process of claim 17.

21. An aqueous emulsion product useful as a hydraulic fluid consisting essentially of the product made by the process of claim 19.

References Cited in the file of this patent

UNITED STATES PATENTS 2,173,909   Kritchevsky _____ Sept. 26, 1939